United States Patent
Sonoda et al.

(10) Patent No.: US 8,903,518 B2
(45) Date of Patent: Dec. 2, 2014

(54) MOTOR CONTROL APPARATUS EQUIPPED WITH DEAD-ZONE PROCESSING UNIT

(75) Inventors: Naoto Sonoda, Minamitsuru-gun (JP); Yukio Toyozawa, Minamitsuru-gun (JP); Yasusuke Iwashita, Minamitsuru-gun (JP)

(73) Assignee: FANUC Corporation, Minamitsuru-gun, Yamanashi (JP)

( * ) Notice: Subject to any disclaimer, the term of this patent is extended or adjusted under 35 U.S.C. 154(b) by 0 days.

(21) Appl. No.: 13/608,031

(22) Filed: Sep. 10, 2012

(65) Prior Publication Data

US 2013/0106336 A1    May 2, 2013

(30) Foreign Application Priority Data

Oct. 27, 2011    (JP) .................. 2011-236157

(51) Int. Cl.
- G05B 5/01 (2006.01)
- G05B 11/01 (2006.01)
- G05B 19/404 (2006.01)

(52) U.S. Cl.
CPC .... G05B 19/404 (2013.01); G05B 2219/41202 (2013.01)
USPC ................ 700/72; 700/28; 318/611; 318/630

(58) Field of Classification Search
USPC .................. 318/611, 400.01, 638; 700/28, 72
See application file for complete search history.

(56) References Cited

U.S. PATENT DOCUMENTS

| | | | |
|---|---|---|---|
| 5,371,451 A | 12/1994 | Toyosawa et al. | |
| 6,593,719 B2 | 7/2003 | Satta et al. | |
| 6,903,527 B2 | 6/2005 | Toyozawa et al. | |
| 2001/0037670 A1* | 11/2001 | Boger et al. | 73/1.72 |
| 2004/0145333 A1 | 7/2004 | Toyozawa et al. | |
| 2007/0159939 A1 | 7/2007 | Kanda | |
| 2009/0192634 A1* | 7/2009 | Fujinaka | 700/42 |
| 2009/0319128 A1* | 12/2009 | Lauer et al. | 701/42 |

FOREIGN PATENT DOCUMENTS

| | | |
|---|---|---|
| CN | 101055465 | 10/2007 |
| JP | 61-045312 A | 3/1986 |
| JP | 04-021101 A | 1/1992 |
| JP | 2840139 | 12/1998 |
| JP | 2001-126421 A | 5/2001 |
| JP | 2002-199767 A | 7/2002 |
| JP | 2004-227163 A | 8/2004 |
| JP | 4043996 | 2/2008 |

* cited by examiner

*Primary Examiner* — Eduardo Colon Santana
*Assistant Examiner* — Bickey Dhakal
(74) *Attorney, Agent, or Firm* — Drinker Biddle & Reath LLP

(57) ABSTRACT

A control apparatus for a motor includes, a position detection unit which detects the position of a driven body, a positional error acquiring unit which acquires for each sampling cycle a positional error representing a deviation between the position command given to the motor and the position of the driven body detected by the position detection unit, a dead-zone processing unit which outputs the positional error by replacing the positional error with zero if the positional error acquired by the positional error acquiring unit lies within a predetermined dead-zone range, and a repetitive control unit which calculates an amount of correction such that the positional error output from the dead-zone processing unit is reduced to zero, and wherein: the motor is controlled based on the positional error acquired by the positional error acquiring unit and the amount of correction calculated by the repetitive control unit.

3 Claims, 10 Drawing Sheets

MOTOR CONTROL APPARATUS EQUIPPED WITH DEAD-ZONE PROCESSING UNIT

RELATED APPLICATION DATA

This application claims priority under 35 U.S.C. §119 and/or §365 to Japanese Application No. 2011-236157 filed Oct. 27, 2011, the entire contents of which are incorporated herein by reference.

BACKGROUND OF THE INVENTION

1. Field of the Invention

The present invention relates to a control apparatus for a motor used in a machine tool, an industrial machine, or the like which is driven and controlled by a control apparatus such as a numeral control apparatus, and more particularly to a motor control apparatus which drives and controls a driven body in accordance with a predefined action pattern by repeating a position command of a specific pattern.

2. Description of the Related Art

When performing machining or the like by repeating a command of a specific pattern, it is known to use repetitive control (learning control) as a method for improving machining accuracy by causing control errors to converge nearly to zero (0). In the repetitive control (learning control), such as described in Japanese Patent Nos. 2840139 and 4043996, for example, the time required to complete a pattern action such as one workpiece rotation is taken as a repetitive (learning) cycle, and a positional error is obtained for each predetermined control cycle by rotating the workpiece a plurality of times and, based on the thus obtained positional error, the amount of correction required is calculated and stored in memory; then, the amount of correction stored in memory for each control cycle in the preceding pattern cycle is added to the positional error obtained for the corresponding control cycle in the current pattern cycle, thereby trying to cause the positional error to converge to zero. There are two methods for performing the repetitive control: one is to perform the control by reference to the position and angle of a driven body, as described in the invention disclosed in Japanese Patent No. 2840139, and the other is to perform the control by reference to the time, as described in the invention disclosed in Japanese Patent No. 4043996.

When controlling the driving of a driven body having a nonlinear frictional characteristic, such as Coulomb friction, by a motor in accordance with a predefined action pattern by performing repetitive control with high precision, if the position command to the motor for driving and controlling the driven body makes a transition from a state other than zero to a state close to zero, and the command thereafter continues to stay in the vicinity of zero, the amount of correction that the control unit outputs may oscillate because of the nonlinear friction of the driven body. As a result, if the repetitive control further continues with the driven body at rest, oscillations will be set up in the driven body.

FIG. 10 is a diagram showing by way of example a nonlinear frictional characteristic having a Stribeck effect. In the illustrated example, viscous friction is assumed to be zero. A stick-slip phenomenon is observed during the driving of a driven body having such a frictional characteristic. FIGS. 11 and 12 are diagrams showing by way of example the simulation results of the oscillations that occur in the driven body having the nonlinear frictional characteristic shown in FIG. 10 when the driven body is driven in a controlled manner by a motor: FIG. 11 is a diagram showing a position command given to the motor for driving and controlling the driven body, and FIG. 12 is a diagram showing positional errors occurring in the driven body when driven by the position command shown in FIG. 11. The position command shown in FIG. 11 is set up so that when a specific pattern varying sinusoidally at 100 Hz is repeatedly commanded, for example, its amplitude is gradually reduced starting at a given point in time until it is finally reduced to zero. When the driven body having the nonlinear frictional characteristic shown in FIG. 10 is repetitively driven and controlled by giving the position command shown in FIG. 11 to the motor, it can be seen from FIG. 12 that after the amplitude of the position command has been reduced to zero, if the zero state continues, oscillations of low frequencies (15 Hz) will be set up. The repetitive control is performed in one of two ways, i.e., by reference to the position and angle of the driven body or by reference to the time, as earlier described, but oscillations such as described above can occur whichever method is employed to operate the motor to drive and control the driven body having such a nonlinear frictional characteristic.

How oscillations such as described above can occur will be described below. When the position command to the motor for driving and controlling the driven body makes a transition to the zero state from a state other than zero, if the position command to the motor is reduced to zero, the amount of correction that the repetitive control unit outputs does not become zero because of the presence of the nonlinear friction of the driven body. The reason is that, while the positional error representing the deviation between the position command and the actual position of the driven body should normally become zero when the amount of correction that the repetitive control unit outputs becomes zero, if the Coulomb friction is larger than the torque that the motor generates based on the corrected position command, the positional error becomes zero before the amount of correction that the repetitive control unit outputs becomes zero. As a result, the amount of correction calculated at the time that the positional error becomes zero (when the amount of correction is not zero) is stored and held in the repetitive control unit. In this way, even when the positional error is zero, since the amount of correction that the repetitive control unit outputs is not zero, the motor speed command created using this amount of correction does not converge to zero. As a result, the integral term of the speed of the driven body being driven in a controlled manner by the motor gradually increases and, when a torque is generated that overcomes the friction, a positional error occurs. Thereupon, the repetitive control unit outputs such an amount of correction as to reduce this positional error. However, since the cycle in which the positional error occurs is not synchronized with the repetitive cycle (learning cycle) of the repetitive control performed by the repetitive control unit, the repetitive control unit performing the repetitive control ends up amplifying this positional error, and oscillations thus occur in the driven body.

SUMMARY OF THE INVENTION

In view of the above problem that may arise when controlling the driving of a driven body by a motor in accordance with a predefined action pattern by means of repetitive control, it is an object of the present invention to provide a motor control apparatus that is capable of suppressing oscillations that can occur in the driven body when the position command to the motor is reduced to zero in order to stop the driven body.

To achieve the above object, a control apparatus for a motor, which drives and controls a driven body in accordance with a predefined action pattern by repeating a position command of a specific pattern, includes, a position detection unit which detects position of the driven body, a positional error acquiring unit which acquires for each sampling cycle a positional error representing a deviation between the position command given to the motor and the position of the driven body detected by the position detection unit, a dead-zone processing unit which outputs the positional error by replacing the positional error with zero if the positional error acquired by the positional error acquiring unit lies within a predetermined dead-zone range, and a repetitive control unit which calculates an amount of correction such that the positional error output from the dead-zone processing unit is reduced to zero, and wherein: the motor is controlled based on the positional error acquired by the positional error acquiring unit and the amount of correction calculated by the repetitive control unit.

If a speed command to the motor has remained equal to or less than a prescribed value for a predetermined period of time, or if the speed detected on the driven body has remained equal to or less than a prescribed value for a predetermined period of time, the dead-zone processing unit may output the positional error by replacing the positional error with zero if the positional error lies within the dead-zone range.

When the positional error acquired by the positional error acquiring unit lies within a range that extends from outside the dead-zone range to inside a buffer zone an inward portion of which overlaps the dead-zone range, the dead-zone processing unit may set a value smaller than the positional error as a new positional error and may output the new positional error, and when the positional error acquired by the positional error acquiring unit lies outside the buffer zone, the dead-zone processing unit may output the positional error directly. In this case, the new positional error that is set when the positional error acquired by the positional error acquiring unit lies within the range extending from outside the dead-zone range to inside the buffer zone is preferably set in accordance with an increasing function which is zero when the positional error acquired by the positional error acquiring unit is located at a boundary of the dead-zone range and which equals the acquired positional error when the positional error acquired by the positional error acquiring unit is located at a boundary of the buffer zone.

The repetitive control unit includes a low-pass filtering unit which cuts off high-frequency components, a memory unit which follows the low-pass filtering unit and which holds the amount of correction for at least a period equal to one sampling cycle; and an adder which sums together a value obtained by multiplying an output of the memory unit by a gain smaller than 1 and the positional error output from the dead-zone processing unit, and wherein, the sum generated by the adder is fed to the low-pass filtering unit.

BRIEF DESCRIPTION OF THE DRAWINGS

The present invention will be more clearly understood with reference to the following accompanying drawings.

FIG. 5a shows the case where the feedback gain $K_c$ of the repetitive control unit is 1, and FIG. 5b shows the case where the feedback gain $K_c$ of the repetitive control unit is smaller than 1.

FIG. 11 shows a position command given to the motor for driving and controlling the driven body.

FIG. 12 shows positional errors occurring in the driven body when driven by the position command shown in FIG. 11.

DETAILED DESCRIPTION

A motor control apparatus equipped with a dead-zone processing unit will be described below with reference to the drawings. It should, however, be understood that the present invention is not limited to the accompanying drawings, nor is it limited to any particular embodiment described herein.

Figure 1:
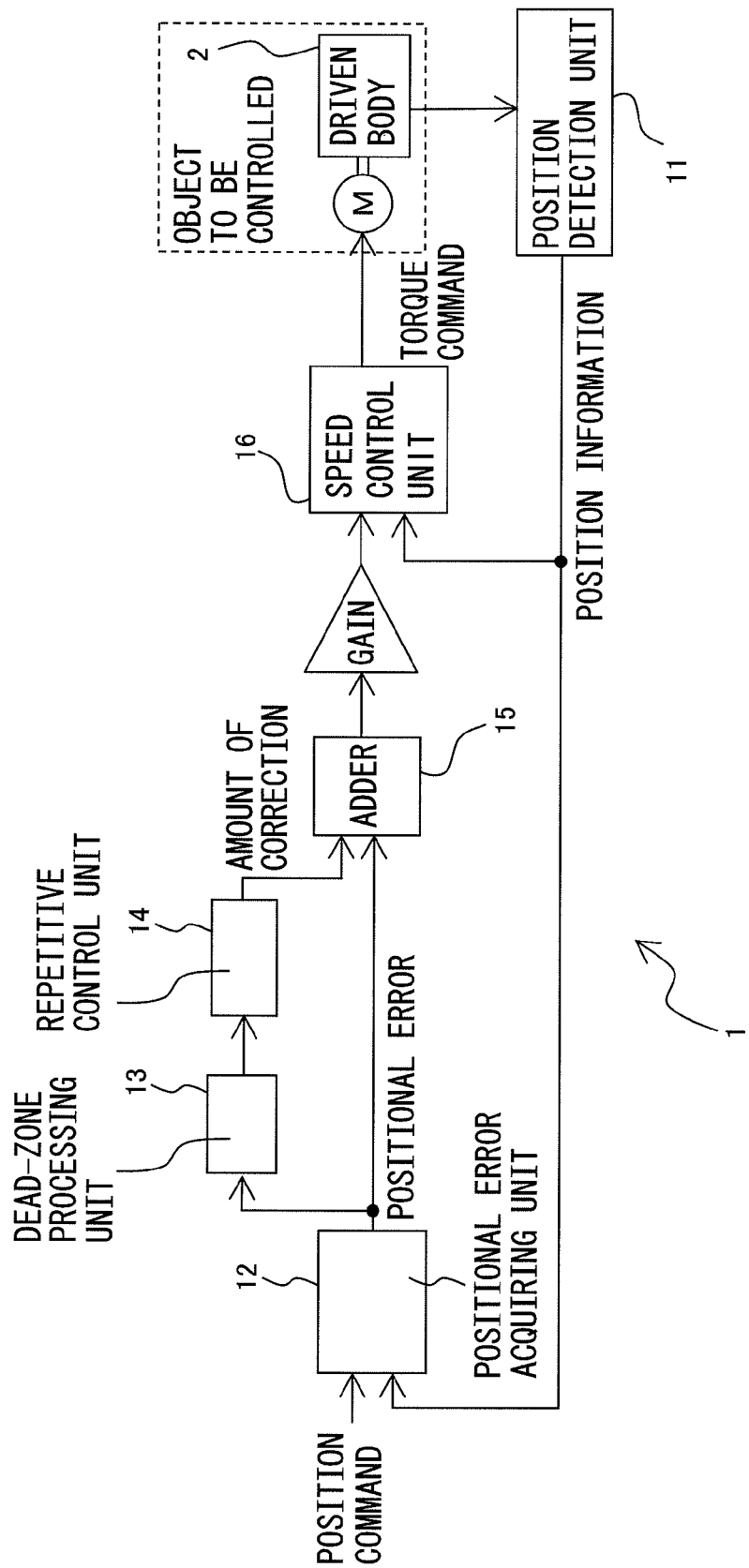
FIG. 1 is a block diagram showing a motor control apparatus according to an embodiment of the present invention.

FIG. 1 is a block diagram showing a motor control apparatus according to an embodiment of the present invention. It is to be understood that, throughout the different drawings given herein, the same reference numerals designate component elements having the same functions. The present embodiment will be described for the case where a driven body 2 connected to a motor M is driven and controlled in accordance with a predefined action pattern by repeatedly giving a position command of a specific pattern to the motor M. Examples of the driven body 2 driven in accordance with a predefined action pattern include a tool that repeatedly performs processing of the same pattern to generate a product.

As shown in FIG. 1, the control apparatus 1 for the motor M, which drives and controls the driven body in accordance with a predefined action pattern by repeating a position command of a specific pattern, includes a position detection unit 11 which detects the position of the driven body 2, a positional error acquiring unit 12 which acquires for each sampling cycle a positional error representing a deviation between the position command given to the motor M and the position of the driven body 2 detected by the position detection unit 11, a dead-zone processing unit 13 which outputs the positional error by replacing the positional error with zero if the positional error acquired by the positional error acquiring unit 12 lies within a predetermined dead-zone range, and a repetitive control unit 14 which calculates an amount of correction such that the positional error output from the dead-zone processing unit 13 is reduced to zero, and wherein the motor M is controlled based on the positional error acquired by the positional error acquiring unit 12 and the amount of correction calculated by the repetitive control unit 14.

The position command is entered into the positional error acquiring unit 12, for example, from a host numerical control apparatus (not shown). The positional error acquired by the positional error acquiring unit 12 and the amount of correction calculated by the repetitive control unit 14 are summed together by an adder 15. The sum is multiplied by a predetermined gain and thereafter supplied to a speed control unit 16 which, based on the supplied information and the position information of the driven body 2 detected by the position detection unit 11, creates a torque command to be given to the motor M. The positional error acquiring unit 12, the dead-zone processing unit 13, the repetitive control unit 14, the adder 15, the gain, and the speed control unit 16 are implemented on an operational processor such as a DSP or an FPGA, and its operation can be defined by a software program. The width of the dead zone used in the processing of the dead-zone processing unit 13 should be suitably set in accordance with a situation, environment, etc. where the motor control apparatus 1 according to the embodiment of the present invention is applied.

Figure 2:
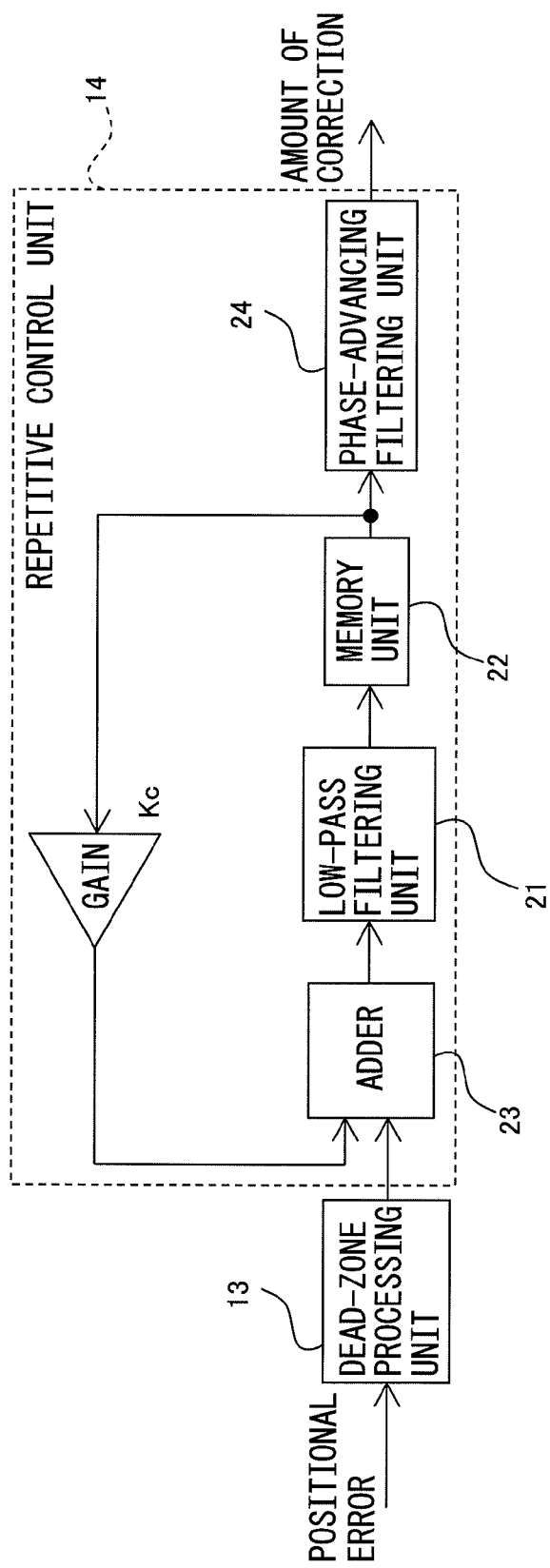
FIG. 2 is a block diagram showing a dead-zone processing unit and a repetitive control unit in the motor control apparatus according to the embodiment of the present invention.

FIG. 2 is a block diagram showing the dead-zone processing unit and the repetitive control unit in the motor control apparatus according to the embodiment of the present invention. The positional error output from the positional error acquiring unit 12 in FIG. 1 is supplied via the dead-zone processing unit 13 to the repetitive control unit 14.

The repetitive control unit 14 includes an adder 23, a low-pass filtering unit 21 which cuts off high-frequency components, a memory unit 22 which follows the low-pass filtering unit 21, and a phase-lead filtering unit 24. The memory unit 22 is a delay memory which holds the output value of the low-pass filtering unit 21 for at least a period equal to one sampling cycle. The amount of correction, output after being held for at least one sampling cycle period in the memory unit 22, is supplied to the phase-lead filtering unit 24. The amount of correction is output from the repetitive control unit 14 after being advanced in phase through the phase-lead filtering unit 24 (i.e., after low frequency components have been cut off). The amount of correction output from the repetitive control unit 14 is input to the adder 15 in FIG. 1. Further, the output after being held in the memory unit 22 is positively fed-back to the adder 23. The feedback gain of the positive feedback in the repetitive control unit 14 is denoted by $K_c$. The adder 23 sums together the amount of correction positively fed-back from the output after being held in the memory unit 22 and the positional error output from the dead-zone processing unit 13. The sum generated by the adder 23 is fed to the low-pass filtering unit 21.

Figure 3:
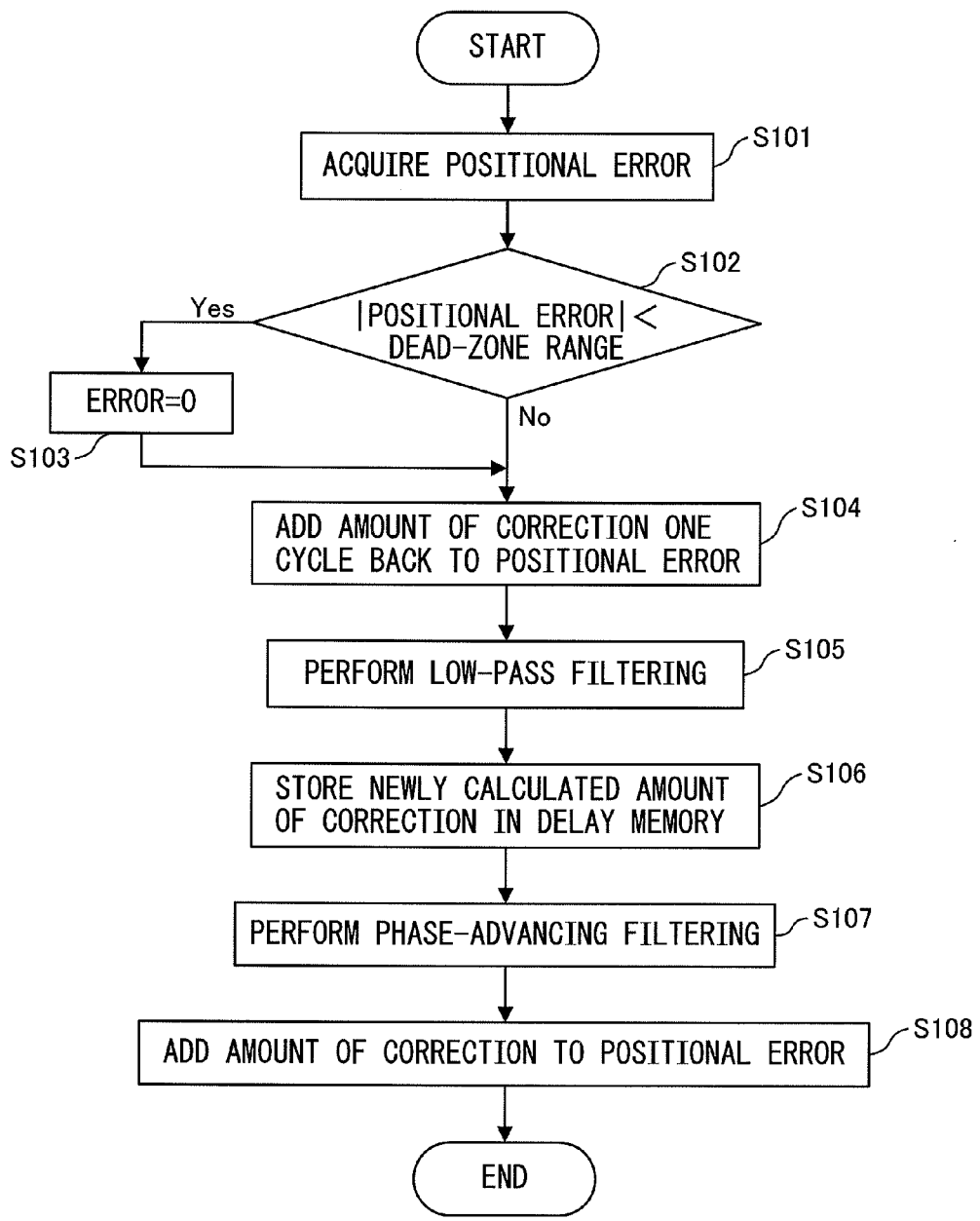
FIG. 3 is a flowchart illustrating the operational flow of the motor control apparatus according to the embodiment of the present invention.

Next, the operational flow of the motor control apparatus 1 described with reference to FIGS. 1 and 2 will be described below. FIG. 3 is a flowchart illustrating the operational flow of the motor control apparatus according to the embodiment of the present invention.

In step S101, the positional error acquiring unit 12 acquires for each sampling cycle a positional error representing a deviation between the position command given to the motor M and the position of the driven body 2 detected by the position detection unit 11. The acquired positional error is supplied to the dead-zone processing unit 13 as well as to the adder 15.

Next, in step S102, the dead-zone processing unit 13 determines whether the positional error acquired by the positional error acquiring unit 12 lies within a predetermined dead-zone range or not. If the positional error lies within the predetermined dead-zone range, the process proceeds to step S103, and the positional error is replaced by zero for output, after which the process proceeds to step S104. If the positional error does not lie within the predetermined dead-zone range, a new positional error is set in accordance with the dead-zone characteristic to be described later, after which the process proceeds to step S104. The positional error output from the dead-zone processing unit 13 is supplied to the repetitive control unit 14.

Since the memory unit 22 holds the output value of the low-pass filtering unit 21 for at least one sampling cycle period, in step S104 the adder 23 sums together the positional error output from the dead-zone processing unit 13 and the value sampled at least one sampling cycle back. The sum generated by the adder 23 is fed to the low-pass filtering unit 21.

Next, in step S105, the low-pass filtering unit 21 performs low-pass filtering to cut off high frequency components contained in the sum generated by the adder 23.

In step S106, the output of the low-pass filtering unit 21 is fed to the memory unit 22 which stores it as the amount of correction. The memory unit 22 holds the output value of the low-pass filtering unit 21 for at least one sampling cycle period.

The amount of correction, output after being held for at least one sampling cycle period in the memory unit 22, is supplied to the phase-lead filtering unit 24. In step S107, the phase-lead filtering unit 24 performs phase-lead filtering by cutting off low frequency components contained in the amount of correction, and outputs the amount of correction thus processed. The amount of correction output from the repetitive control unit 14 is supplied to the adder 15 in FIG. 1.

Further, the output after being held for at least one sampling cycle period in the memory unit 22 is positively fed-back to the adder 23; in step S108, the adder 23 sums together the amount of correction positively fed-back from the output after being held in the memory unit 22 and the positional error output from the dead-zone processing unit 13. Thereafter, the above process is repeated.

Figure 4:
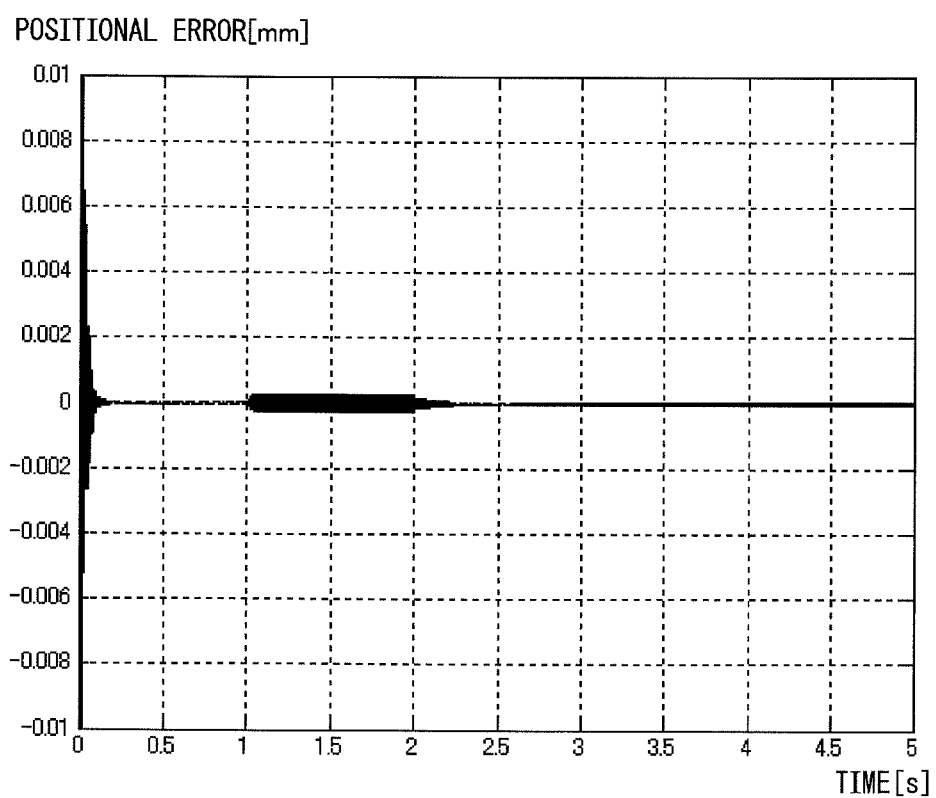
FIG. 4 is a diagram showing the simulation results of oscillations that occur in a driven body having a nonlinear frictional characteristic such as shown in FIG. 10 when the driven body is driven and controlled by the motor control apparatus according to the embodiment of the present invention.
Figure 10:
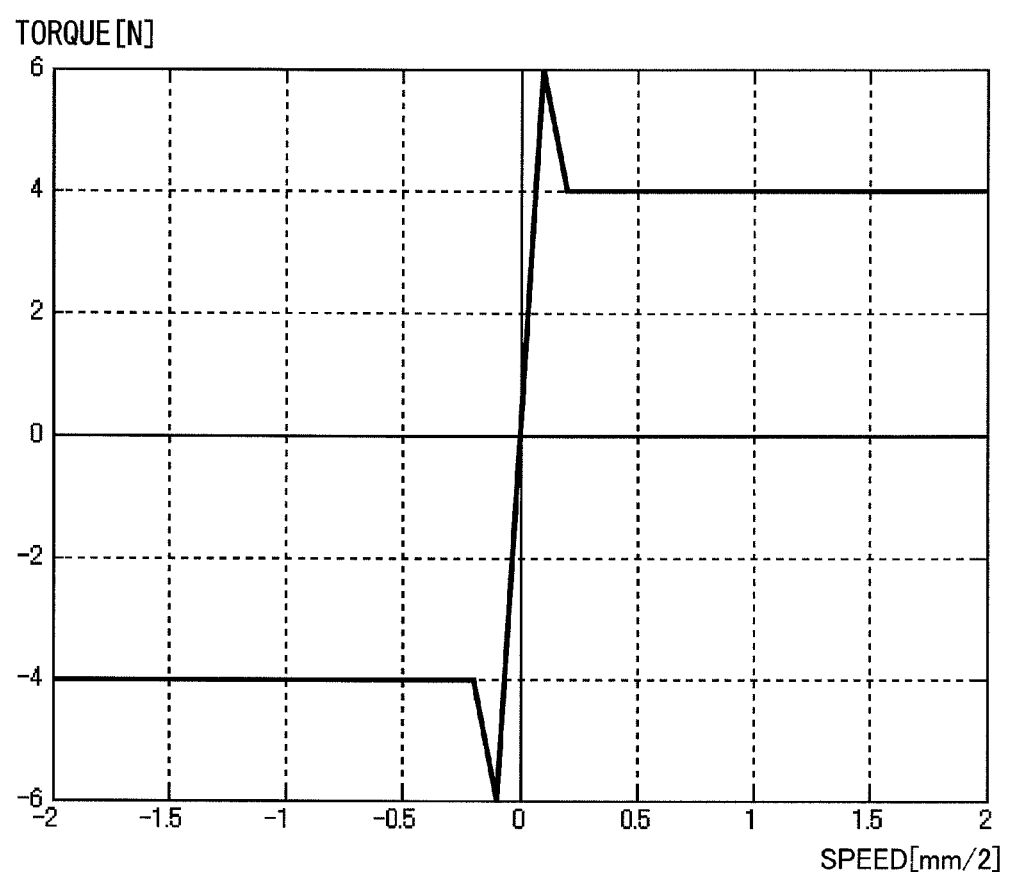
FIG. 10 is a diagram showing by way of example a nonlinear frictional characteristic having a Stribeck effect.

FIG. 4 is a diagram showing the simulation results of the oscillations that occur in the driven body having the nonlinear frictional characteristic shown in FIG. 10 when the driven body is driven and controlled by the motor control apparatus according to the embodiment of the present invention. In the simulation, the position command shown in FIG. 11 was given to the motor M, as in the case of the prior art shown in FIG. 12.

Figure 11:
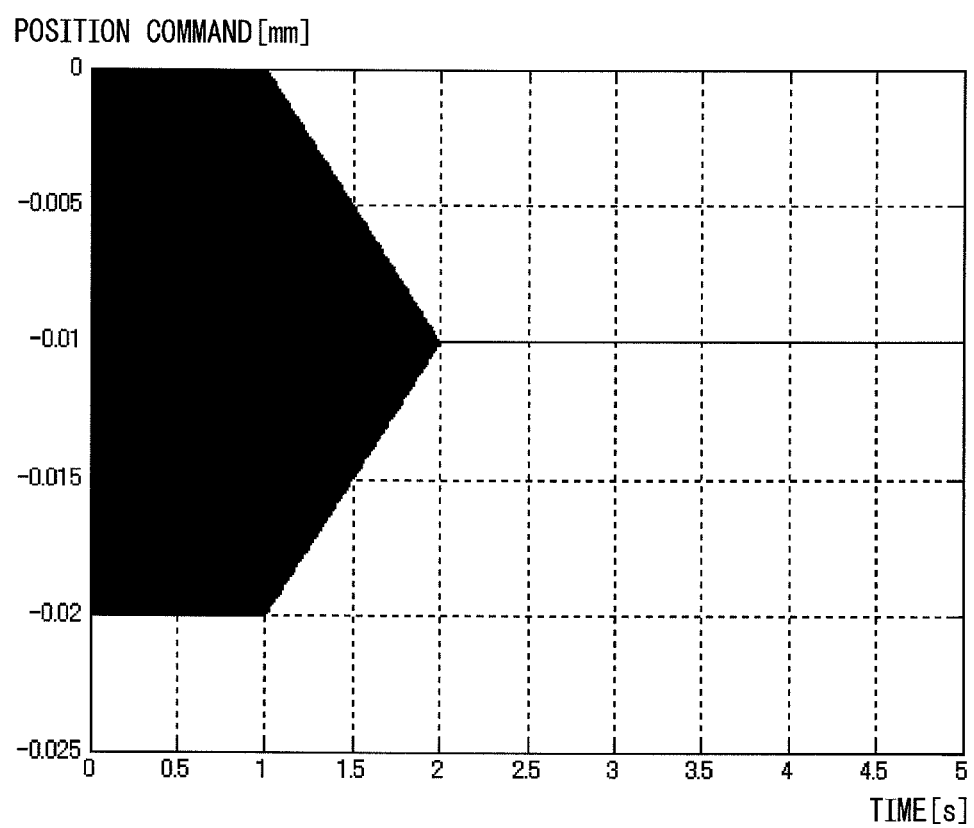
FIG. 11 is a diagram showing by way of example the simulation results of oscillations that occur in the driven body having the nonlinear frictional characteristic shown in FIG. 10 when the driven body is driven in a controlled manner by a motor; more specifically.
Figure 12:
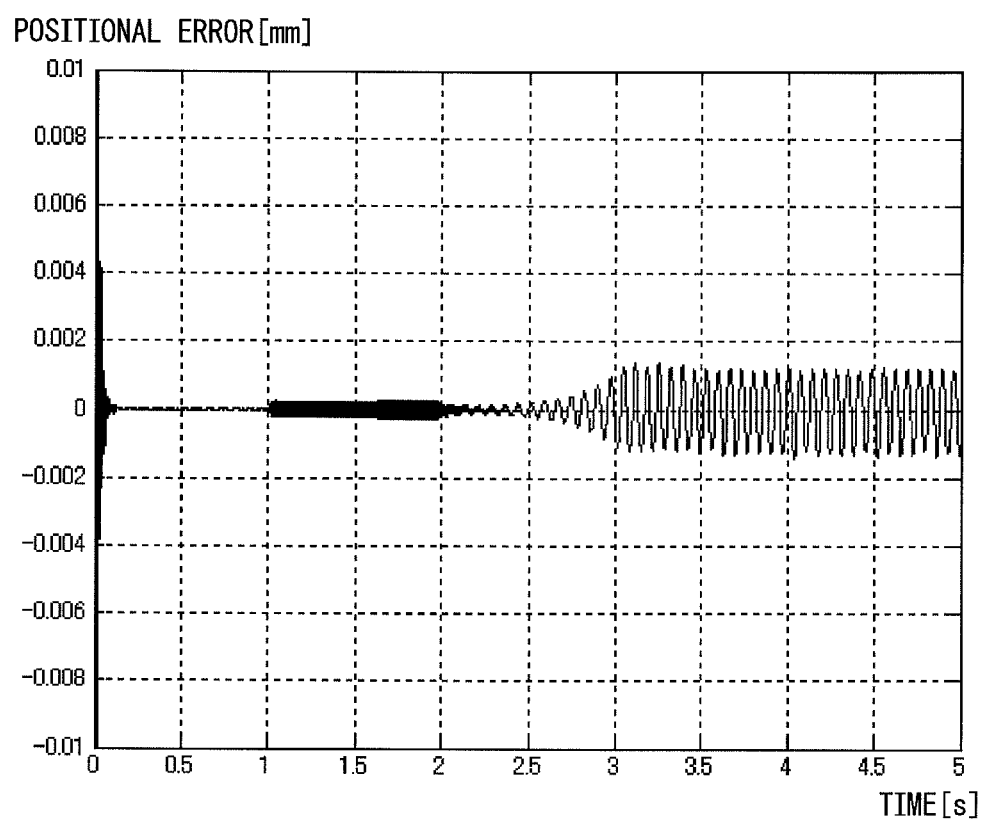
FIG. 12 is a diagram showing by way of example the simulation results of oscillations that occur in the driven body having the nonlinear frictional characteristic shown in FIG. 10 when the driven body is driven in a controlled manner by a motor; more specifically.

According to the position command shown in FIG. 11, while a specific pattern varying sinusoidally at 100 Hz is being repeated, its amplitude is gradually reduced starting at a given point in time until it is finally reduced to zero. When the driven body having the nonlinear frictional characteristic shown in FIG. 10 is repetitively driven and controlled by giving the position command shown in FIG. 11 to the control apparatus 1 for the motor M according to the embodiment of the present invention, it can be seen from FIG. 4 that even if the zero state of the amplitude of the position command continues, oscillations do not occur in the driven body 2. In this way, when controlling the driving of the driven body 2 by the motor in accordance with a predefined action pattern by means of repetitive control, the control apparatus 1 for the motor M according to the embodiment of the present invention is capable of suppressing oscillations that can occur in the driven body 2 when the position command to the motor M is reduced to zero in order to stop the driven body 2.

When the dead zone is set as described above, since the repetitive control unit 14 does not work to correct for any positional error associated with the width of the dead zone, the positional error does not converge to zero but has a positional error corresponding to the width of the dead zone, which can lead to the possibility of oscillations being set up in the driven body 2. For example, in the case of the position command shown in FIG. 11, since the speed command invariably passes near zero speed, if the dead zone is set the positional error may increase. To avoid such a situation, provision may be made so that if the speed command to the motor M has remained equal to or less than a prescribed value for a predetermined period of time, or if the speed detected on the driven body 2 has remained equal to or less than a prescribed value for a predetermined period of time, the dead-zone processing unit 13 outputs the positional error by replacing it with zero if it lies within the dead-zone range. With this provision, the positional error can be made to converge to zero, thereby suppressing oscillations that may occur in the driven body 2.

Figure 5A:
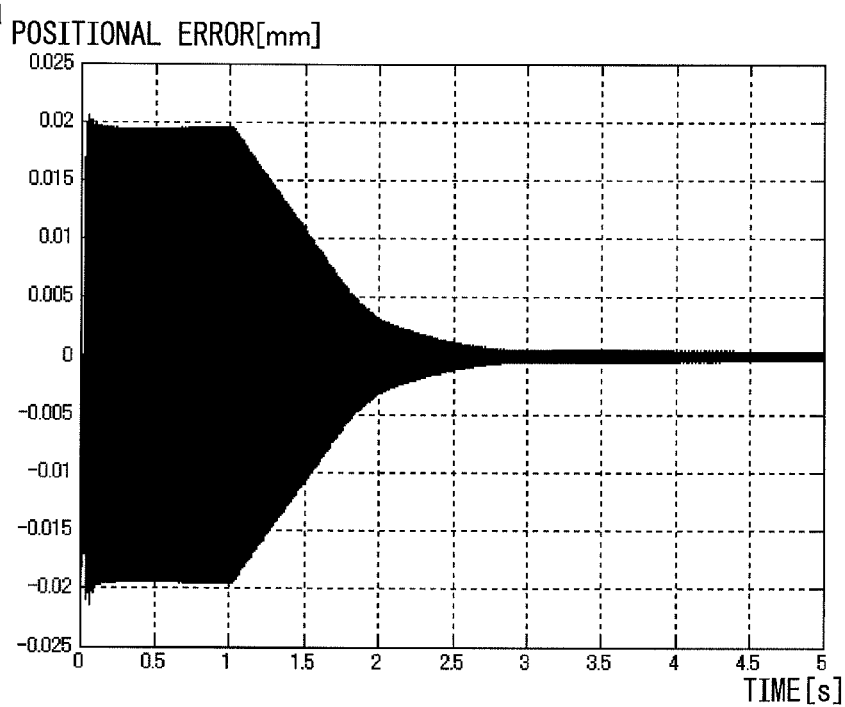
FIGS. 5a and 5b are diagrams showing the simulation results representing the relationship between the feedback gain $K_c$ of the repetitive control unit and the output of the repetitive control unit according to the embodiment of the present invention.
Figure 5B:
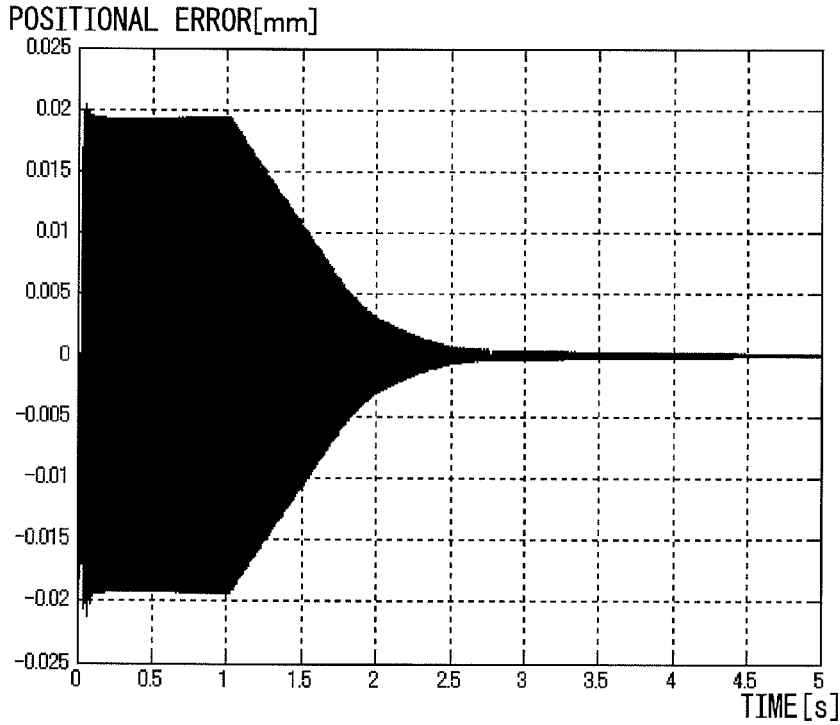

Further, when the dead zone is set, the positional error does not converge to zero but has a positional error corresponding to the dead zone, as described above, and because of this, coupled with the nonlinear friction of the driven body 2, the amount of correction that the repetitive control unit 14 outputs does not converge to zero. In this case, if the friction state of the driven body 2 changes, oscillations may again occur in the driven body 2. To avoid such a situation, the feedback gain $K_c$ of the positive feedback in the repetitive control unit 14 may be set smaller than 1. With this setting, the amount of correction that the repetitive control unit 14 outputs can be made to gradually decrease to zero with a certain time constant, and oscillations can thus be prevented from occurring in the driven body 2. The time constant with which the amount of correction that the repetitive control unit 14 outputs is caused to converge to zero is determined by the magnitude of the feedback gain $K_c$. FIGS. 5a and 5b are diagrams showing the simulation results representing the relationship between the feedback gain $K_c$ of the repetitive control unit and the output of the repetitive control unit according to the embodiment of the present invention: FIG. 5a shows the case where the feedback gain $K_c$ of the repetitive control unit is 1, and FIG. 5b shows the case where the feedback gain $K_c$ of the repetitive control unit is smaller than 1. In the simulation, the position command shown in FIG. 11 was given to the motor M. According to the position command shown in FIG. 11, while a specific pattern varying sinusoidally at 100 Hz is being repeated, its amplitude is gradually reduced starting at a given point in time until it is finally reduced to zero. Here, suppose that the driven body having the nonlinear frictional characteristic shown in FIG. 10 is repetitively driven and controlled by giving the position command shown in FIG. 11 to the control apparatus 1 for the motor M according to the embodiment of the present invention; then, in the case where the feedback gain $K_c$ of the repetitive control unit 14 is 1, as shown in FIG. 5a, even when the position command is reduced to zero, the amount of correction that the repetitive control unit 14 outputs does not converge to zero but maintains a certain constant value. By contrast, in the case where the feedback gain $K_c$ of the repetitive control unit 14 is smaller than 1, as shown in FIG. 5b, when the position command is reduced to zero, the amount of correction that the repetitive control unit 14 outputs converges to zero in a corresponding manner. In this way, when the feedback gain $K_c$ of the repetitive control unit 14 is set smaller than 1, the amount of correction that the repetitive control unit 14 outputs converges to zero when the position command to the motor M is reduced to zero in order to stop the driven body 2 when controlling the driving of the driven body 2 by the motor in accordance with a predefined action pattern by means of repetitive control; as a result, even if the friction state of the driven body 2 changes, oscillations of the driven body 2 can be suppressed.

Figure 6:
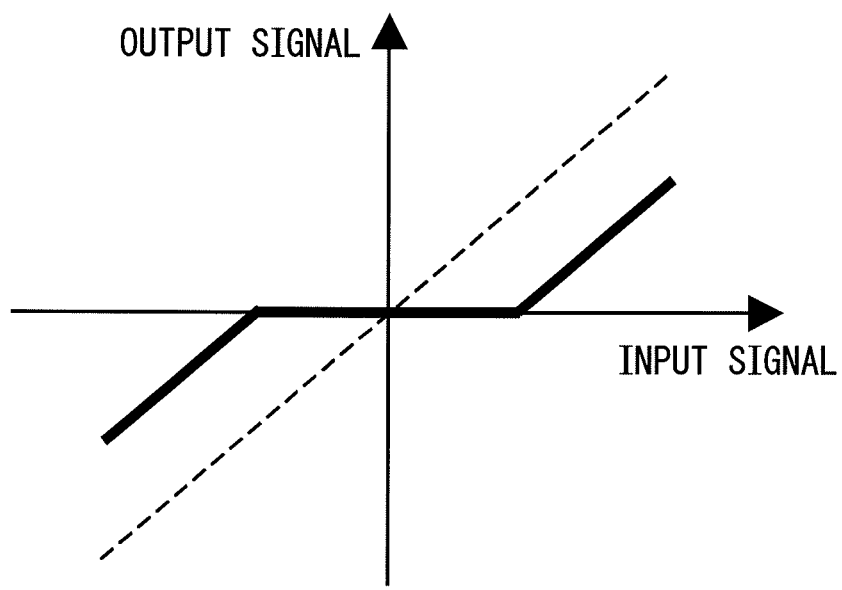
FIG. 6 is a diagram (part 1) showing by way of example a dead-zone characteristic used in the prior art.
Figure 7:
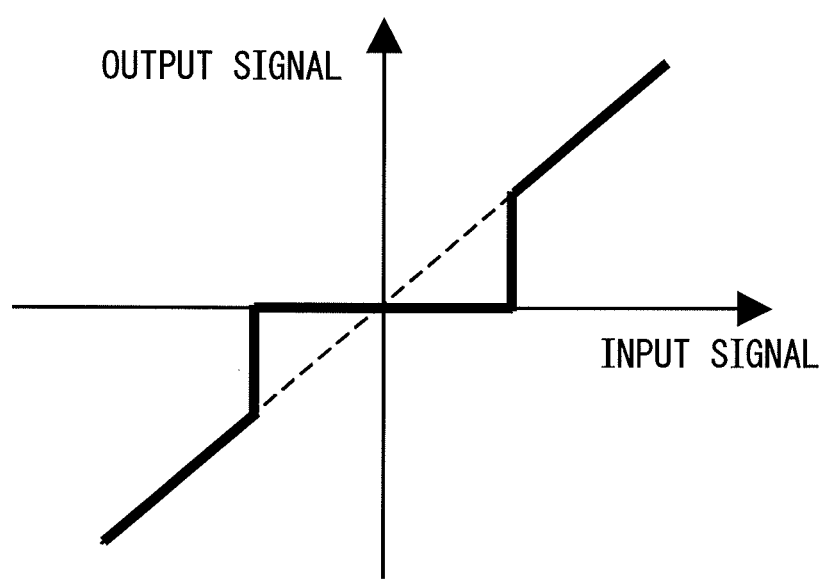
FIG. 7 is a diagram (part 2) showing by way of example a dead-zone characteristic used in the prior art.
Figure 8:
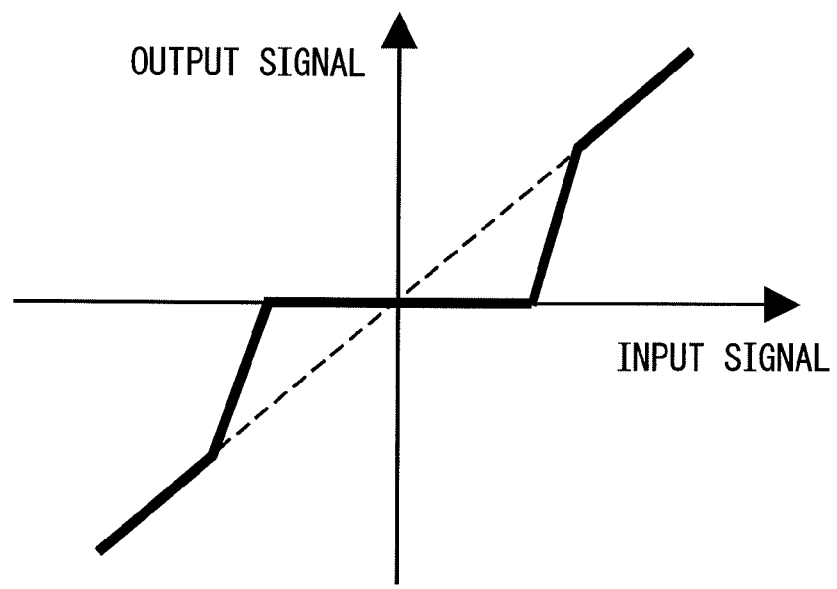
FIG. 8 is a diagram (part 1) for explaining a dead-zone processing characteristic used in the dead-zone processing unit in the motor control apparatus according to the embodiment of the present invention.
Figure 9:
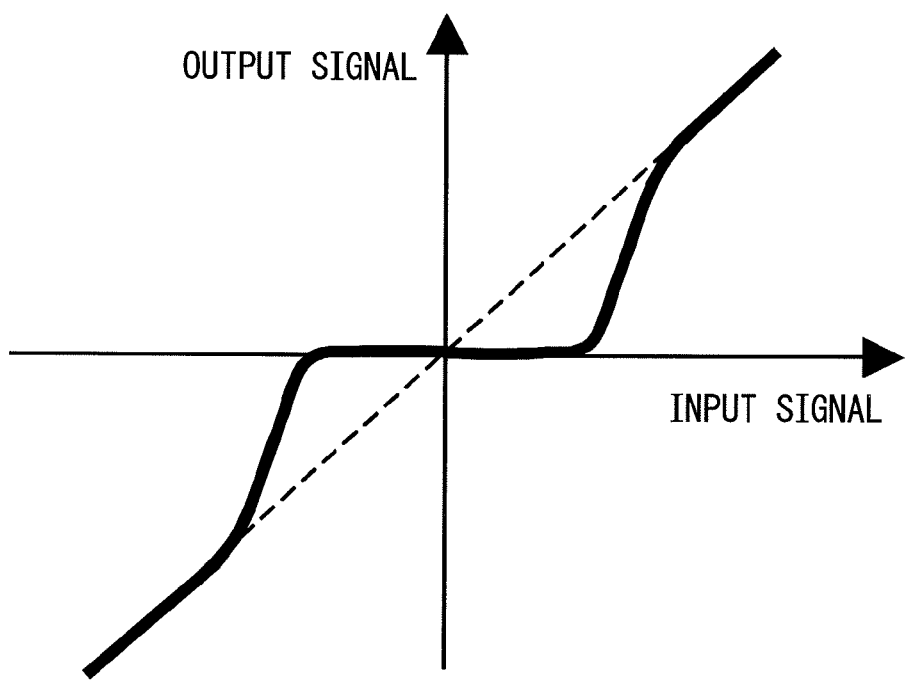
FIG. 9 is a diagram (part 2) for explaining a dead-zone processing characteristic used in the dead-zone processing unit in the motor control apparatus according to the embodiment of the present invention.

Next, the processing performed by the dead-zone processing unit 13 will be described in further detail. FIGS. 6 and 7 are diagrams showing by way of example the dead-zone processing characteristics used in the prior art. On the other hand, FIGS. 8 and 9 are diagrams for explaining the dead-zone processing characteristics used in the dead-zone processing unit in the motor control apparatus according to the embodiment of the present invention. According to the dead-zone processing commonly used in the prior art, when the input signal is in the dead-zone range, the output signal is set to zero, as shown in FIG. 6, and when the input signal is outside the dead-zone range, the output signal is set in accordance with equation 1 below.

Output signal=(|Input signal|−Dead-zone width)* (Sign of input signal)   (Equation 1)

Using the dead-zone characteristic shown in FIG. 6 is advantageous from the standpoint of enhancing control stability, because the discontinuity of the output signal across the boundaries of the dead-zone range can be reduced. However, if the dead-zone characteristic shown in FIG. 6 is applied directly to the dead-zone processing unit in the motor control apparatus according to the embodiment of the present invention, since the dead-zone width is subtracted from the input signal as shown by equation 1 when the input signal is outside the dead-zone range, the gain of the repetitive control unit 14 is, in effect, reduced, degrading the ability of the repetitive control unit 14 to follow the variation of the positional error.

On the other hand, in the case of the dead-zone characteristic shown in FIG. 7, when the input signal is in the dead-zone range, the output signal is set to zero, and when the input signal is outside the dead-zone range, the output signal is set equal to the input signal; if this dead-zone characteristic is applied to the dead-zone processing unit in the motor control apparatus according to the embodiment of the present invention, it becomes possible to avoid the reduction in the gain of the repetitive control unit 14, i.e., the problem that occurs in the case of the dead-zone characteristic shown in FIG. 6. However, in this case, there occurs a problem in terms of the control stability of the repetitive control unit 14 because the output signal becomes discontinuous.

In view of the above, the dead-zone processing unit 13 in the motor control apparatus 1 according to the embodiment of the present invention uses the dead-zone characteristic shown in FIG. 8 or 9.

In the example shown in FIG. 8, when the positional error acquired by the positional error acquiring unit 12 lies within the predetermined dead-zone range, the positional error is output after replacing it with zero, and when the acquired positional error lies within a range that extends from outside the dead-zone range to inside a buffer zone an inward portion of which overlaps the dead-zone range, a value smaller than the positional error is set as a new positional error which is output; on the other hand, when the acquired positional error is outside the buffer zone, the acquired positional error is directly output. The new positional error that is set when the positional error acquired by the positional error acquiring unit 12 lies within the range extending from outside the dead-zone range to inside the buffer zone is set so as to have continuity in accordance with an increasing function which is zero when the positional error acquired by the positional error acquiring unit 12 is located at a boundary of the dead-zone range and which equals the acquired positional error when the positional error acquired by the positional error acquiring unit 12 is located at a boundary of the buffer zone. By using such a dead-zone characteristic, the ability of the repetitive control unit 14 to follow the variation of the positional error can be enhanced, and at the same time, the control stability of the repetitive control unit 14 increases. Accordingly, oscillations of the driven body 2 can be suppressed quicker and in a more stable manner.

In the example shown in FIG. 9, the dead-zone characteristic shown in FIG. 8 is modified so as to make smoother the continuity of the output signal across the boundary of the dead-zone range and across the boundary of the buffer zone. This serves to further increase the control stability of the repetitive control unit 14.

The present invention can be applied to a control apparatus for a motor used in a machine tool, an industrial machine, or the like which is driven and controlled by a control apparatus such as a numeral control apparatus. More particularly, the invention can be applied to a motor control apparatus which drives and controls a driven body in accordance with a predefined action pattern by repeating a position command of a specific pattern. Examples of the driven body driven in accordance with a predefined action pattern include a tool that repeatedly performs processing of the same pattern to generate a product.

According to the present invention, since the dead-zone processing unit, which outputs the positional error by replacing it with zero if the positional error between the position command given to the motor and the position of the driven body detected by the position detection unit lies within the predetermined dead-zone range, is placed in front of the repetitive control unit, and the positional error thus output from the dead-zone processing unit is supplied to the repetitive control unit, the repetitive control unit is unaffected by the nonlinear friction of the driven body. Then, the repetitive control unit calculates the amount of correction such that the positional error output from the dead-zone processing unit is reduced to zero, and adds the amount of correction to the positional error in order to drive and control the driven body by the motor; accordingly, when controlling the driving of the driven body by the motor in accordance with a predefined action pattern by means of repetitive control, it is possible to suppress oscillations that can occur in the driven body when the position command to the motor is reduced to zero in order to stop the driven body.

When the dead zone is set, since the repetitive control unit does not work to correct for any positional error associated with the width of the dead zone, the positional error does not converge to zero but has a positional error corresponding to the width of the dead zone, which can lead to the possibility of oscillations being set up in the driven body; however, according to the preset invention, if the speed command to the motor has remained equal to or less than a prescribed value for a predetermined period of time, or if the speed detected on the driven body has remained equal to or less than a prescribed value for a predetermined period of time, the dead-zone processing unit outputs the positional error by replacing it with zero if it lies within the dead-zone range. With this arrangement, the positional error can be made to converge to zero, thereby suppressing oscillations that may occur in the driven body.

Furthermore, according to the present invention, when the positional error acquired by the positional error acquiring unit lies within a range that extends from outside the dead-zone range to inside a buffer zone an inward portion of which overlaps the dead-zone range, the dead-zone processing unit sets a value smaller than the positional error as a new positional error and outputs the thus set new positional error; on the other hand, when the positional error acquired by the positional error acquiring unit lies outside the buffer zone, the positional error is directly output. With this arrangement, oscillations of the driven body can be suppressed quicker and in a more stable manner.

Further, according to the present invention, the repetitive control unit includes a low-pass filtering unit which cuts off high-frequency components, a memory unit which follows the low-pass filtering unit and which holds the amount of correction for at least a period equal to one sampling cycle, and an adder which sums together a value obtained by multiplying the output of the memory unit by a gain smaller than 1 and the positional error supplied from the dead-zone processing unit, and the sum generated by the adder is fed to the low-pass filtering unit. With this arrangement, even if the friction state of the driven body changes, oscillations of the driven body can be suppressed.

What is claimed is:

1. A control apparatus for a motor, which drives and controls a driven body in accordance with a predefined action pattern by repeating a positions command of a specific pattern, comprising:
   a position detection unit which detects position of said driven body;
   a positional error acquiring unit which acquires for each sampling cycle a positional error representing a deviation between said position command given to said motor and said position of said driven body detected by said position detection unit;
   a dead-zone processing unit which replaces said positional error that is located within the dead-zone range with zero and outputs the zero, when (i) said positional error acquired by said positional error acquiring unit lies within a predetermined dead-zone range and when (ii) a speed command to said motor has remained equal to or less than a prescribed value for a predetermined period of time, or the speed detected on said driven body has remained equal to or less than a prescribed value for a predetermined period of time; and
   a repetitive control unit which calculates an amount of correction such that said positional error output from said dead-zone processing unit is reduced to zero, and wherein
   said motor is controlled based on said positional error acquired by said positional error acquiring unit and said amount of correction calculated by said repetitive control unit, and
   wherein said repetitive control unit includes:
   a low-pass filtering unit which cuts off high-frequency components,
   a memory unit which follows said low-pass filtering unit and which holds said amount of correction for at least a period equal to one sampling cycle, and
   an adder which sums together a value obtained by multiplying an output of the memory unit by a gain smaller than 1 and said positional error output from said dead-zone processing unit, and wherein said sum generated by said adder is fed to the low-pass filtering unit.

2. The motor control apparatus according to claim 1, wherein when said positional error acquired by said positional error acquiring unit lies within a range outside a boundary of said dead-zone range to lie inside a buffer zone, a boundary of said buffer zone located outside said dead-zone range, said dead-zone processing unit sets a value smaller than said positional error as a new positional error and outputs said new positional error, and when said positional error acquired by said positional error acquiring unit lies outside said buffer zone, said dead-zone processing unit outputs said positional error directly.

3. The motor control apparatus according to claim 2, wherein said new positional error that is set when said positional error acquiring unit lies within said range extending from outside said dead-zone range to inside said buffer zone is set in accordance with an increasing function which is zero when said positional error acquired by said positional error acquiring unit is located at the boundary of said dead-zone range and which equals said acquired positional error when said positional error acquired by said positional error acquiring unit is located at the boundary of said buffer zone.

* * * * *